United States Patent

[11] 3,633,782

| [72] | Inventor | Alvin R. Bellinger |
| | | 8576 Freeland, Detroit, Mich. 48228 |
| [21] | Appl. No. | 19,856 |
| [22] | Filed | Mar. 16, 1970 |
| [45] | Patented | Jan. 11, 1972 |

[54] KNOCKOUT BOX FOR AN ELECTRICAL SWITCH AND RECEPTACLE
10 Claims, 4 Drawing Figs.

| [52] | U.S. Cl. | 220/3.5 |
| [51] | Int. Cl. | H02g 3/12 |
| [50] | Field of Search | 220/3.2, 3.3, 3.4, 3.5, 3.6 |

[56] References Cited
UNITED STATES PATENTS

| 1,722,430 | 7/1929 | Kelly | 220/3.4 X |
| 1,795,701 | 3/1931 | Barnes | 220/3.4 |
| 2,297,862 | 10/1942 | Bachmann | 220/3.3 UX |
| 2,568,942 | 9/1951 | Bindel | 220/3.3 X |
| 3,394,509 | 7/1968 | McKinley | 220/3.4 X |
| 3,499,570 | 3/1970 | Butler | 220/3.3 |

Primary Examiner—M. Henson Wood, Jr.
Assistant Examiner—Michael Y. Mar
Attorney—Whittemore, Hulbert & Belknap ABSTRACT: An outlet box is provided for mounting on a wall in the space between the usual spaced apart panels defining the wall structure. The outlet box has spaced apart pressure structures which, after insertion of the box through an opening in one of the panels into the space between the panels, are spread apart to make pressure engagement with the interior wall surfaces and firmly mount the outlet box in place.

PATENTED JAN 11 1972 3,633,782
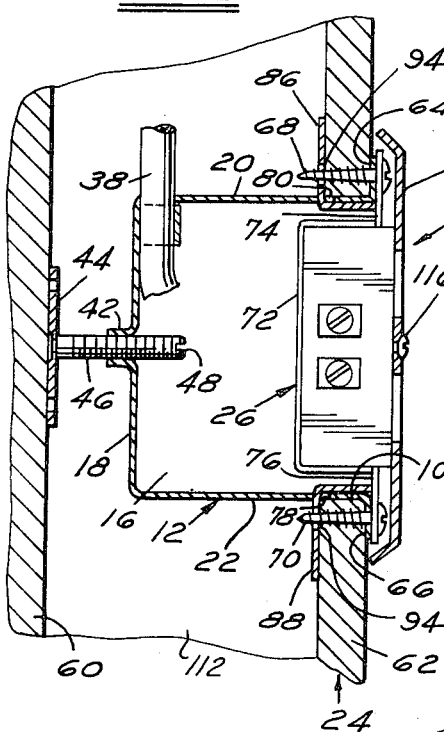
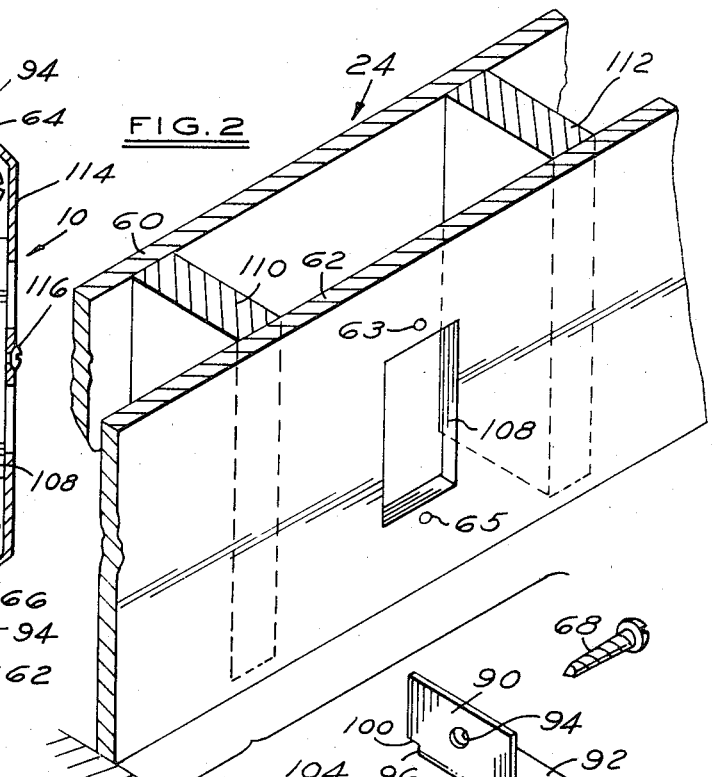
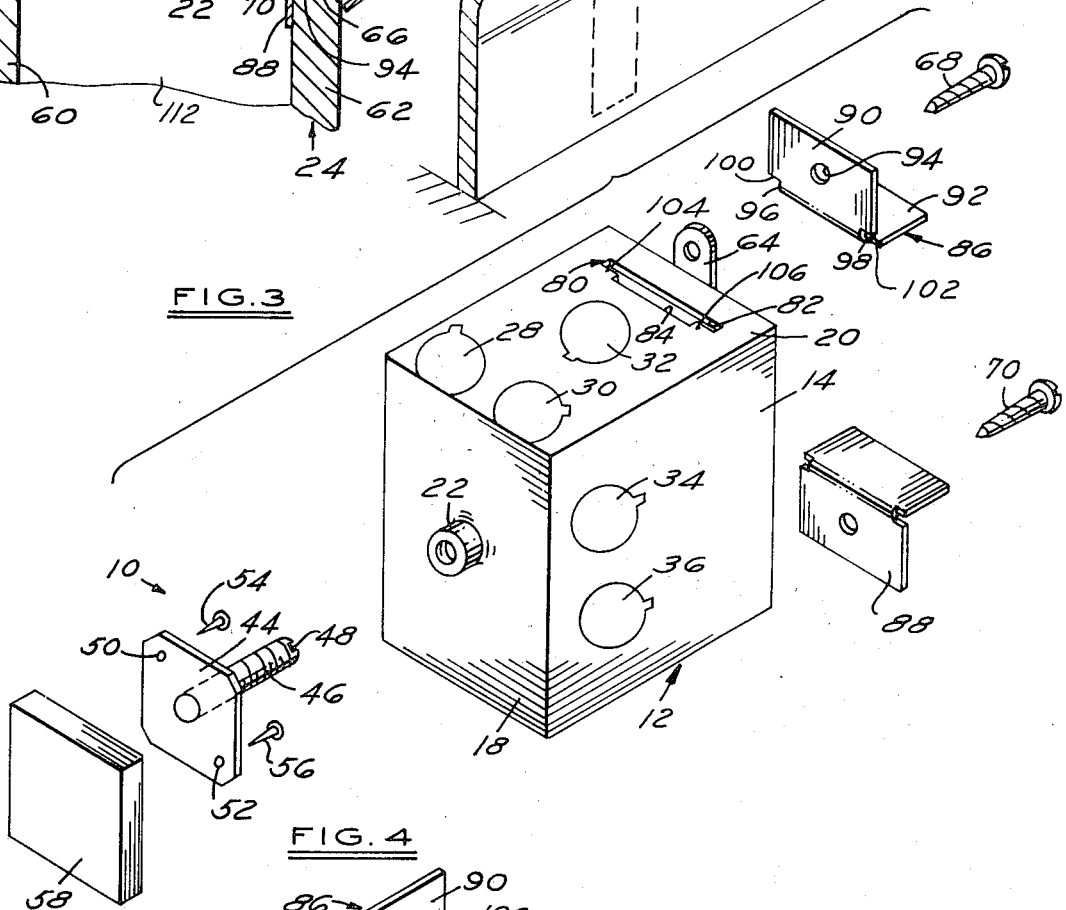
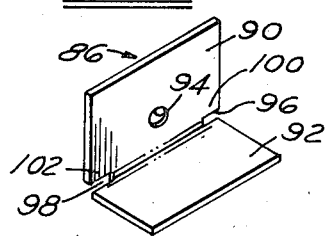
INVENTOR
ALVIN R. BELLINGER
BY
Whittemore, Hulbert &
Belknap ATTORNEYS

3,633,782

KNOCKOUT BOX FOR AN ELECTRICAL SWITCH AND RECEPTACLE

BACKGROUND OF THE INVENTION

It has been generally difficult for electricians to install outlet boxes for outlet switches or plug receptacles in walls because of lack of adequate support for the outlet boxes. It has been necessary, in many instances, for the electrician to locate a stud in the wall and use this stud as the mounting structure for the outlet box. This requires cutting a hole or notch into the stud, which is time consuming and also limits the locations at which the outlet box may be mounted.

Various techniques have been proposed in the past for installing the outlet boxes by means of clamps which engage the interior wall panel of the wall structure which comprises spaced apart panels. The wall structure may be either an interior room partition in which both wall panels are relatively weak constructions such as plaster, lathe, or wallboard, or an exterior wall structure in which the exterior wall panel may be of solid construction but where the interior wall panel is of the low strength nature of plaster or wallboard. The use of clamps necessarily results in engagement of a portion of the weaker strength wall panel along the edge of the opening cut into the wall panel to receive the outlet box. Various attempts have been made to provide large bearing areas so that the load of the outlet box may be widely distributed. However, forces on the outlet box, such as manipulation of a switch plunger or insertion or withdrawal of a plug, tend to twist or tilt the outlet box thus applying a leverage against the edge of the wall panel engaged tending to break this edge away.

The present invention provides an outlet box which is in pressure engagement with the interior surfaces of both of the spaced apart panels forming the wall structure. Neither wall panel is clamped individually and the pressure is always distributed between the two wall panels. Any tendency to twist the outlet box as the result of applied forces is counteracted by pressure engagement of the wall surface remote from the wall surface in which the opening is formed thereby greatly diminishing the tendency to damage or break a portion of the wall panel supporting the outlet box.

SUMMARY OF THE INVENTION

An outlet box is provided for mounting in a wall comprising spaced apart panels defining a space therebetween and with an opening in one of the panels. The outlet box comprises an open faced casing having a backwall structure and a sidewall structure. First pressure structure is positioned behind the backwall structure and spaced therefrom. Means connect the first pressure structure to the casing. Second pressure structure is positioned exteriorly of the casing sidewall structure adjacent to the open face of the casing. Means connect the second pressure structure to the casing. One of the means connecting the first and second pressure structures to the casing is adjustable to permit relative spreading apart of the first and second pressure structures for pressure contact of the first and second pressure structures with the interior surfaces of the spaced apart panels of a wall after insertion of the casing and first and second pressure structures through the opening in one of the wall panels.

IN THE DRAWING

FIG. 1 is a side elevational view in section of an outlet box of the present invention illustratively mounted in place on a wall in accordance with one embodiment of the present invention;

FIG. 2 is a view in perspective of a section of a wall which has been prepared for reception of the outlet box of the present invention;

FIG. 3 is an exploded view in perspective of the outlet box assembly; and

FIG. 4 is a view in perspective of a clamping element forming part of the outlet box assembly.

As will be noted in the drawing, the outlet box 10 includes an open front casing 12 having sidewalls 14, 16, backwall 18, top wall 20 and bottom wall 22. The outlet box illustrated is adapted to be mounted on a wall structure 24 and to carry a receptacle 26, illustratively a receptacle having dual plug receiving sockets. The unit may be used in connection with a single socket receptacle and may also be used in connection with the mounting of an electrical switch. The walls are provided with a plurality of knockouts 28, 30, 32, 34, 36 any one of which may be removed for insertion of an electrical power cable 38 at a convenient location.

A projection defining an internally threaded nut 42 is provided on the back wall 18. This projection may be struck from the material of the backwall and then threaded or a separate nut may be secured over an opening in the backwall as by welding or other fastening means. The nut 42 is adapted to receive a pressure plate or part 44 having a threaded shank or part 46 extending from one face thereof. The shank 46 is fixedly attached to the center of the plate 44 as by welding. The outer end of the shank 46 is provided with a slot 48 for engagement by a screwdriver. The shank 46 is threadingly received in the nut 42 and normally projects into the interior of the casing 12 as illustrated in FIG. 1. Openings 50, 52 are provided in diametrically opposed corners of the plate 44 for insertion of screws 54, 56 to engage a wood block 58 and secure it to the plate. The block 58 is utilized when the distance between the panels 60, 62 of the wall structure 24 is so great that it is necessary to use a shim in order to make pressure contact between the interior panel surfaces. In the embodiment illustrated in FIG. 1, it was not necessary to use a shim.

An outwardly extending tab 64, 66 is provided on the forward edges of the top and bottom walls 20, 22 centrally thereof. The tabs 64, 66 have apertures to threadingly receive screws 68, 70 for mounting of the receptacle 26. As will be noted, the receptacle includes a U-shaped support bracket 72 having outwardly extending apertured flanges 74, 76 for insertion of the screws. The screws may also threadingly engage the wall panel 62 and openings 63, 65 may be drilled through the wall panel to facilitate reception of the screw shanks. Additionally, the wall panel may be routed in the area around the openings 63, 65 to receive the tabs 64, 66 in flush arrangement with the outer surface of the panel 62.

A laterally extending slot 78, 80 is provided in the bottOm and top walls 22, 20 adjacent the forward edges thereof. Each of the slots terminate short of the sidewalls and include a first elongated portion 82 positioned forwardly and a second shorter portion 84 positioned rearwardly with respect to the front edge of the casing. The slots 78, 80 loosely receive the clamp elements 86, 88. Each clamp element comprises an angle-shaped structure with one wall 90 which assumes a vertical position upon mounting of the outlet box and a second wall 92 which assumes a horizontal position upon mounting of the outlet box. An aperture 94 is provided in the wall 90 for passage of the inner end of the screws 68, 70, the aperture 94 being of greater diameter than the screw so that it does not make contact with the screw shank. A slot 96, 98 is provided at the juncture of the walls 90, 92. The slots extend inwardly for a short distance sufficient to permit movement of the wall 90 into the short portion 84 of the slot whereby the wall 90 is first inserted through the elongated slot portion 82 and thence moved back to the shorter slot portion 84 with the clamps 86, 88 contacting the inner surface of the wall panel 62. The shank 46 is threaded until tight pressure engagement is obtained with respect to the pressure plate 44 and clamps 86, 88. The casing is now securely fastened to the wall structure 24. The power cable 38 is then arranged as desired in the casing and clamped in place. For the sake of convenience, the cable 38 is preferably inserted into the casing prior to securing the casing in place. The receptacle 26 is then screwed into place and the proper leads from the cable 38 are connected to the receptacle. A cover plate 114 may then be mounted on the receptacle 26 by means of a screw 116 received in a conventional threaded opening provided in such receptacles. The assembly now is complete and ready for use. As previously mentioned, in the event that the distance between the panels 60, 62 is larger than that shown, the shim block 58 may be used.

It should be understood that the longitudinally extending intermediate edges of slots 78, 80 are placed in the outlet box 10 a distance equal to the thickness of the wall structure 24. If the wall structure 24 has a thickness of one-half inch then the aforementioned intermediate edges of slots 78, 80 are located one-half inch from the front face of the outlet box 10. For a wall structure 24 having a thickness, as an example, of five-eighths inch, the intermediate edges of the slots 78, 80 are five-eighths inch from the front face of the box and would be so designated or stamped on the outlet box 10 during manufacture thereof.

What I claim as my invention is:

1. An outlet box for mounting in a wall comprising spaced apart panels defining a space therebetween and with an opening in one of the panels, said outlet box comprising an open-faced casing having a backwall structure and a sidewall structure, first pressure structure positioned behind the backwall structure and spaced therefrom and adapted for only frictional surface to surface contact with the inner surface of one of the panels, means connecting said first pressure structure to the casing, second pressure structure positioned exteriorly of the casing sidewall structure adjacent to the open face of the casing and adapted for only frictional surface to surface contact with the inner surface of the other of the panels, means connecting said second pressure structure to the casing, one of the means connecting the first and second pressure structures to the casing being adjustable to permit exclusively relative spreading apart of the first and second pressure structures for pressure contact of the first and second pressure structures with the interior surfaces of the spaced apart panels of a wall after insertion of the casing and first and second pressure structures through said opening in one of the wall panels.

2. An outlet box as defined in claim 1, further characterized in that the means connecting said first pressure structure to the casing is adjustable, said first pressure structure comprising a pressure plate, a threaded shank extending from said pressure plate, a threaded opening in the backwall structure of the casing threadedly receiving said threaded shank, a portion of said threaded shank extending into the interior of the casing for manual manipulation.

3. An outlet box as defined in claim 2, further characterized in that said second pressure structure comprises a pair of angle clamps, two oppositely disposed sidewall portions of the sidewall structure of the casing each having a slot therein adjacent the open face of the casing, said clamps each having one wall extending through one of the slots in a plane parallel to the plane of the wall panels for pressure engagement with the adjacent wall panels, and each of the clamps having a second wall at substantially right angles to the first wall for engagement with the adjacent casing sidewall portion.

4. An outlet box as defined in claim 3, and further characterized in that each of the clamps has a slot extending inwardly from each side thereof at the juncture of the two clamp walls, the slots in the casing sidewall portions each having a first elongated portion adjacent the open face of the casing to receive the first wall of the clamp and a second shorter portion immediately adjacent thereto and spaced rearwardly of the open facing of the clamp defining oppositely disposed lips over which the slotted portions of the clamps are received after insertion of said first clamp wall through the first elongated slot portion.

5. An outlet box as defined in claim 2, and further characterized in the provision of a detachable shim securable to the pressure plate to increase the thickness thereof.

6. An outlet box as defined in claim 3, and further characterized in the provision of outwardly extending apertured tabs extending from the edges of the open face of the casing for reception of screws to mount a receptacle in the casing, said first walls of said clamps being in alignment with said tabs and having openings therein for passage of the screws without engagement therewith.

7. An outlet box as defined in claim 1, further characterized in that the means connecting said first pressure structure is adjustable.

8. An outlet box as defined in claim 7, further characterized in that said first pressure structure comprises a pressure part having a threaded shank extending from said pressure part, and a threaded opening in the backwall structure of the casing threadingly receiving said threaded shank.

9. An outlet box as defined in claim 1, further characterized in that the said second pressure structure comprises a pair of angle clamps, two oppositely disposed sidewall portions of the sidewall structure of the casing each having a slot therein adjacent the open face of the casing, said clamps each having one wall extending through one of the slots in a plane parallel to the plane of the wall panels for pressure engagement with the adjacent wall panel, and each of the clamps having a second wall for engagement with the adjacent casing sidewall portion.

10. An outlet box as defined in claim 9, and further characterized in the provision of outwardly extending apertured tabs extending from the edges of the open face of the casing for reception of screws to mount a receptacle in the casing, said first walls of said clamps being in alignment with said tabs and having openings therein for passage of the screws without engagement therewith.

* * * * *